United States Patent [19]

Kowalczyk

[11] Patent Number: 4,641,136

[45] Date of Patent: Feb. 3, 1987

[54] SECURITY EYES FOR PREVENTION OF CAR ACCIDENTS

[76] Inventor: Thaddeus Kowalczyk, 8163 Lochdale, Dearborn Heights, Mich. 48075

[21] Appl. No.: 809,318

[22] Filed: Dec. 16, 1985

Related U.S. Application Data

[63] Continuation-in-part of Ser. No. 724,775, Apr. 18, 1985, abandoned.

[51] Int. Cl.$^4$ .......................... G08G 1/16; G08G 1/00; B60D 1/00
[52] U.S. Cl. ...................................... 340/903; 340/62; 340/904; 342/7; 367/909
[58] Field of Search ............. 180/167, 169; 340/52 R, 340/52 F, 52 B, 53, 62, 901, 902, 903, 904; 364/426; 367/909; 343/7 VM

[56] References Cited

U.S. PATENT DOCUMENTS

| | | | |
|---|---|---|---|
| 2,896,089 | 7/1959 | Wesch | 340/903 |
| 3,210,726 | 10/1965 | Copsy | 340/903 |
| 3,340,763 | 9/1967 | Power | 340/903 |
| 3,891,966 | 6/1975 | Sztankay | 340/903 |
| 3,892,483 | 7/1975 | Saufferer | 340/903 |
| 4,240,152 | 12/1980 | Duncan | 340/901 |
| 4,407,388 | 10/1983 | Steel | 340/52 B |
| 4,447,800 | 5/1984 | Kasuya | 340/901 |
| 4,491,840 | 1/1905 | Nishikawa | 340/903 |

FOREIGN PATENT DOCUMENTS

| | | | |
|---|---|---|---|
| 2050358 | 8/1979 | Fed. Rep. of Germany | 340/903 |
| 2040092 | 8/1980 | United Kingdom | 367/909 |

*Primary Examiner*—John W. Caldwell, Sr.
*Assistant Examiner*—Tyrone Queen
*Attorney, Agent, or Firm*—Brooks & Kushman

[57] ABSTRACT

This invention allows for the use of safety apparatus at the front and rear of the automobile, which serve as an addditional pair of "eyes" for the driver. The apparatus comprises a security system for the prevention of automobile collisions. The apparatus at the front of the automobile is connected to the front wheel system or to the steering mechanism by an appropriate rotary device which revolves so that the beams or waves do not encounter vehicles in oncoming lanes going in the opposite direction. The electronic safety apparatus emits beams or waves whose length is automatically regulated to correspond to weather conditions and to the speed of the vehicle so as to ensure safe braking distance.

10 Claims, 2 Drawing Figures

SECURITY EYES FOR PREVENTION OF CAR ACCIDENTS

This is a continuation-in-part of application Ser. No. 724,775, filed Apr. 18, 1985, now abandoned.

TECHNICAL FIELD

This invention relates to the use of the ideal safety apparatus whose beams or waves as the case may be, reflect off an object and activate the electricity to the particular elements which slow the moving vehicle or bring it to a complete stop, as the need arises, atuomatically.

BACKGROUND ART

The aim of the "Security Eyes" invention as applied to passenger cars is to protect individuals from death or bodily injury and to prevent car collisions and collisions with stationary objects. There has been an astronomical increase in the number of cars around the world. These cars are driven in all kinds of weather conditions by all kinds of people: elderly people with slowed reactions, new driver with little experience, intoxicated drivers, tired drivers on long hauls, people with a history of heart problems, nervous drivers with reverse reactions (accelerating instead of braking)—all these have increased the number of collisions, deaths and injuries.

The problem of how to prevent such accidents has been undergoing constant analysis. Probably, the best solution would be to make use of "Security Eyes" in the manufacture of cars. The use of this invention will save many lives, reduce the number of collisions and reduce automobile insurance rates.

The prior art illustrates numerous collision avoidance systems such as the U.S. Pat. Nos. 2,896,089 to Wesch; 3,210,726, Copsy; 3,340,763 Power; 3,892,483 Saufferer; 3,891,966 Sztankay; 4,240,152 Duncan et al; 4,407,388 Steel; 4,447,800 Kasuya et al; and 4,491,890 Nishikawa et al.

DISCLOSURE OF THE INVENTION

Many years have passed since the invention of the automobile. Today, there are millions of them in varying sizes, in varying weights, transporting not only people but manufactured goods as well. To this day, the only safety features that have been devices (apart from brakes) are the retractable bumpers and seat belts—air bags being still a thing of the future. The vehicles move on their own, manipulated by man who, for one reason or another is unable to prevent accidents. The "Security Eyes" system would seem to be one of the most required items in our automobiles. One of the following apparatuses may be used to execute this invention: (a) ultrasonic waves; (b) ideal radar; (c) retroreflective scanner. One of these apparatuses, which is the safety in use and the least expensive to manufacture based on the capabilities of present technology, may be used as a safety device in our automobiles. The installation of one of these apparatuses inside the front panel of the automobile as an additional pair of "eyes" will enable us to protect automobiles and its occupants from automobile collisions. A switch mounted in the car's interior allows the driver to turn on the apparatus (i.e. in a first step). When starting the engine, we automatically turn on the auxiliary element of the safety apparatus with the exception of the automatic brakes. The automatic brakes may be turned on or off by the driver as desired by the interior switch (i.e. in a second step).

The use of ultrasonic waves includes an ultrasonic transmitter and receiver which emits ultrasonic waves in an appropriately wide range, at the appropriate distance and at the appropriate moment which are reflected off every encountered object. Upon returning, these reflected waves turn on the electricity in four steps to the individual elements in the automobile.

The use of an ideal radar apparatus includes a radar cell transfer and receiver which emits radio waves in an approximately wide range, at the approximate distance and at the approximate moment which are reflected off every encountered object. Upon returning, these beams turn on the electricity in four steps to the individual elements in the automobile.

The use of a retroreflective scanner entails a photoelectric cell transfer and receiver which emits beams in an appropriately wide range, at the appropriate distance and at the appropriate moment which are reflected off only those objects that it encounters which have a retroreflective target. Upon returning, these beams turn on the electricity in four steps to the individual elements in the scanner.

Each of the three above-described apparatuses has an automatic regulator which aids in regulating the length of the emitted beams or waves, as the case may be. The length of the emitted beams or waves in each of these apparatuses is automatically regulated to correspond to weather conditions and to the speed of the automobile by means of the speedometer or in accordance with air pressure resistance by means of plates which are part of the device so as to ensure safe braking distance. In each of the apparatuses, upon encountering an object at an appropriate distance and at an appropriate moment, the emitted beams or waves reflect off said object and upon returning, turn on the electricity to the warning signal on the instrument panel such as a lamp in the first step, thereby warning the driver that he is too close to said object. Otherwise, the signal becomes louder, informing the driver that there is danger if the distance and appropriate moment warrants it. This takes place during the second step. At the same time, warning lights come on at the rear of the automobile warning other drivers that we are braking. Also at this time, the electricity to the electromagnet is turned on. In the electromagnet, the external pull-bar which works in one step is connected to the carburetor and the screw-control (if the given automobile has such a device); this bar partially cuts off the supply of fuel to the engine by controlling the throttle valve thus reducing the speed of the automobile and turns off the screw control. If, at this time, the encountered object begins to move further away, the apparatus will start to turn itself off systematically. If the automatic brakes are engaged and the said object begins to come closer, the action of applying the brakes by the driver turns off the automatic brakes during that particular time. Otherwise, given an appropriate distance and the appropriate moment, this apparatus will during the third step turn on the electricity to the electromagnet in which internal pull-bar which works in two steps and which is connected to the braking system, will begin to slow the vehicle gently during its first step. If the encountered object beings to move away from the field of the apparatus, the apparatus will begin to disengage systematically. If said object moves closer, then given the appropriate distance and moment, the beam or wave of the safety apparatus will during the fourth step turn on more power to the electromagnet in which the internal pull-bar completely stops the automobile in its second step. As the object disappears from the field of the emitted beams or waves of the apparatus, the apparatus disengages itself and leaves the protected automobile at the disposal of the driver. In slight turns to the left or right, the front safety apparatus by means of its linkage with the front wheel system or the steering mechanism by an appropriate rotary device such as a cable operating through appropriate gearing, revolves so that the beams or waves do not encounter vehicles in oncoming lanes going in the opposite direction. In a 90-degree turn, turning on the directional lights automatically turns off the safety apparatus.

The following apparatus as described below protects the vehicle at the time of backing. A photoelectric scanner (diffuse-reflective LED scanner) is installed at the rear of the automobile. This switch includes a photoelectric cell transfer and receiver. The beam emitted from the photoelectric cell in an appropriately wide range is reflected off an object at an appropriate distance and turns on the electricity to the electromagnet which automatically stops the vehicle. These apparatuses react and execute their functions without a reaction from the driver.

BEST MODE FOR CARRYING OUT THE INVENTION

Figures 1, 2:
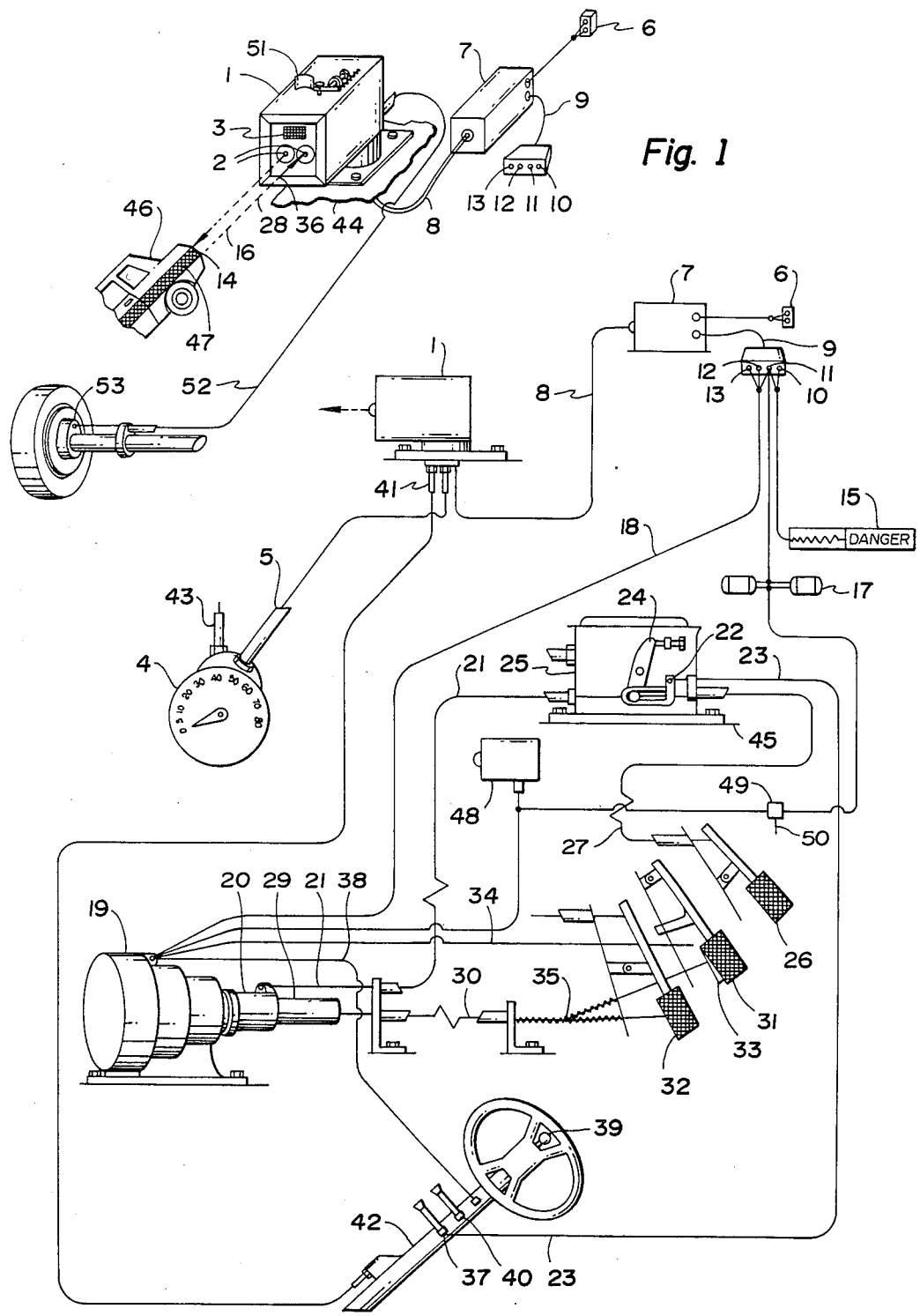
FIG. 1 is a frontal and slightly side view of the safety apparatus which shows a radar cell and the automatic regulator; this figure also shows a frontal and slightly side view of the modular remote amplifier with relay output and the wheel system which is connected to the safety apparatus in order to regulate it when making turns. This is the main apparatus used in association with other specific devices in the invention called "Security Eyes".
FIG. 2 is an overall view showing how the particular elements are connected to the safety apparatus. The speedometer is connected to the safety apparatus for the purpose of regulating the length of emitted beams or waves. The steering system is connected to the safety apparatus in order to regulate it when making turns. The electromagnet is connected by an electric supply line to the safety apparatus whose one external pull-bar is connected to the carburetor and a second, internal pull-bar is connected to the brake system.

What follows is a detailed description of the invention, which is illustrated in the drawing and whose construction of the main and individual elements presents this new invention. We can use the following in the main safety apparatus 1: an ideal radar device or an ultrasonic transceiver including also a retroreflective scanner. A cell 2 comprises a transceiver. Automatic regulator 3 which regulates the needed length of the emitted beams in accordance with the weather conditions and the speedometer 4 reading which automatically regulates the length of the emitted beams in relation to the vehicle speed. An appropriate linking device 5 connects the speedometer 4 to the safety apparatus 1. An air pressure plate 51 is mounted on the housing of the device 1 to generate a signal which, in turn, regulates the legnth of beams or waves. Point 6 connects the flow of electricity from the power source to the modular remote amplifier with relay output 7 from which the required electrical power flows by means of line 8 to the safety apparatus 1 in which the cells 2 emits beams or radio waves as the case may be, which when reflected off an encountered object turn on the electricity in four steps depending on the given distance and moment. When using a retroreflective scanner from which the cell 2 emits beams which reflect only off an object that has retroreflector target, this beam upon returning through devices 7 turns on the electricity in four steps depending on the given distance and moment by means of the electric supply line 9 to points 10, 11, 12 and 13. The beam or wave emitted from the safety apparatus and reflected off an object at distance 14 turns on the electricity by means of point 10 to the instrument panel 15, warning the driver that a given object is in front of us. The emitted beam or wave reflected off an object at distance 16 turns on the electricity to the instrument panel 15 by means of point 11 informing the driver that there is danger. At the same time, the electricity for the warning lights 17 at the rear of the automobile turns on, warning the drivers behind us that we are braking. Also, concurrently, the electricity to the electromagnet 19 is turned on by means of the electrical supply line 18. In the electromagnet 19, the external pull-bar 20 is connected by means of line 21 to device 22 connected to screw-control line 23. After the electromagnet is turned on, device 22 turns off the screw-control and retracts device 24 which regulates the flow of fuel to the engine in the carburetor 25 and disengages the accelerator 26 by means of the linking cable 27. The beam or wave which is reflected off an object at distance 28 turns on the electricity by means of point 12 to the electromagnet 19 in which the internal pull-bar 29 works in two steps and is connected by line 30 to the braking system and to pedals 31 and 32. After the electricity is turned on in the electromagnet, this bar in its first step will partially slow the moving vehicle. By using the pedal 31, we automatically turn off the electricity by means of a constructed switch 33 which is connected by means of the electrical supply line 34 to the electromagnet 19 in which internal pull-bar 29 is immobilized during the time that we are using the pedal 31. With an automatic transmission, there is no pedal 32. Springs 35 hold the cables during braking. The beam or waves emitted from this apparatus and reflected off an encountered object at distance 36 turns on additional electrical power to the electromagnet 19 by means of point 13. In the electromagnet 19, internal pull-bar 29 completely stops the moving vehicle in step 2. Line 23 connects the switch screw-control 37 to device 22. Electrical supply line 38 connects switch 39 which works in two steps: during the first step, we turn on or off the entire apparatus; during the second step, we turn on or off only the automatic brakes. The switch should alway be turned on in the first step by means of which we turn on the auxiliary elements of the safety apparatus with the exception of the automatic brakes. By using the directional signal switch 40, we may turn off the entire apparatus. Linkage preferably connects the safety apparatus 1 to the front wheel system 53 to rotate therewith, as shown in FIG. 1. The linkage preferably comprises a single cable 52 with appropriate interconnecting gearing. Alternatively, as shown in FIG. 2, a cable 41 with appropriate gearing connects the steering system 42 to the apparatus 1. The cable 41 connects the safety apparatus to the steering system 42 which turns the safety apparatus 1 in the appropriate direction when making turns. In either embodiment, the beams or waves are kept parallel with the front wheels. Line 43 which connects the transmission to the speedometer 4 which indicates the speed of the automobile. The automobile body 44 to which the safety apparatus 1 is attached. The engine body 45 to which we fasten the carburetor 25. Object 46 and retroreflector target 47 on the vehicle from which the beam emitted only from a retroreflective scanner is reflected. A diffuse reflective scan 48 is connected by means of the electric supply line to switch 49 which turns on the electricity to the warning lights when backing the automobile. Line 50 comprises a power supply line.

What is claimed is:

1. A collision avoidance system for an automobile or the like having a front wheel system, a braking system and a steering system, said system comprising:
   means on the automobile for emitting a signal in the vicinity of the automobile, for receiving at least a portion of the emitted signal which is reflected from an object to be avoided and for generating a control signal having a magnitude proportional to the distance between the automobile and the object;
   means for rotatably mounting said emitting means on said automobile; means for connecting said mounting means to the steering system of the automobile so that said emitting means rotates in synchronism with the turning of the steering system; and
   control means responsive to said control signal for automatically actuating the braking system when the magnitude of said control signal is at least a first value.

2. The system of claim 1 wherein said emitting means includes a radar system.

3. The system of claim 1 wherein said emitting means includes a retroreflective scanner.

4. The system of claim 1 including a lamp visible to the driver of said automobile and which is automatically actuated when the magnitude of said control signal is at least a second predetermined value.

5. The system of claim 1 wherein said control means includes means responsive to said control signal for disabling the throttle of said automobile when the magnitude of said control signal is at least a second preselected value.

6. The system of claim 1 including means responsive to the speed of said automobile for controlling the distance that the signal is emitted by said emitting means.

7. The system of claim 1 including means responsive to manual actuation by the driver for disabling said control means.

8. The system of claim 1 including a medium applied to said object which is reflective of said signal.

9. A collision avoidance system for a wheeled vehicle having a fuel throttle, a steering system, a front wheel system and a braking system, comprising:
   means for sensing the presence of an object such as another vehicle, said sensing means including means for transmitting a signal in the vicinity of the vehicle which is reflected off said object and means for receiving portions of said signal reflected from said object;
   means for connecting the steering system of the vehicle to said transmitting means and for rotating said transmitting means so that the transmitting means tracks the turning movement of the vehicle steering system;
   means for generating a control signal which is proportional in magnitude to the distance between said vehicle and the sensed object;
   control means responsive to said control signal and having first and second outputs for respective outputting first and second command signals in accordance with the magnitude of said control signal;
   means coupled to said control means and with said braking system for automatically actuating said braking system in response to said first command signal when the sensed object is within a first distance of said vehicle; and
   means coupled to said control means and with said fuel throttle for automatically disabling said throttle in response to said second command signal when the sensed object is within a second distance of said vehicle.

10. The system as claimed in claim 9 wherein said control means has a third output for outputting a third channel signal in accordance with the magnitude of said control signal and wherein said system further comprises means coupled to said control means and responsive to said third command signal for providing the driver of said vehicle with a visual indication of the presence of a sensed object when said object is within a third distance of said vehicle.

* * * * *